(12) United States Patent
Rehders

(10) Patent No.: US 10,815,038 B2
(45) Date of Patent: Oct. 27, 2020

(54) CONTAINER FOR A TOBACCO RELATED PRODUCT

(71) Applicant: REEMTSMA CIGARETTENFABRIKEN GMBH, Hamburg (DE)

(72) Inventor: Thorben Rehders, Hamburg (DE)

(73) Assignee: REEMTSMA CIGARETTENFABRIKEN GMBH, Hamburg (DE)

( * ) Notice: Subject to any disclaimer, the term of this patent is extended or adjusted under 35 U.S.C. 154(b) by 121 days.

(21) Appl. No.: 16/329,055

(22) PCT Filed: Aug. 24, 2017

(86) PCT No.: PCT/EP2017/071274
§ 371 (c)(1),
(2) Date: Feb. 27, 2019

(87) PCT Pub. No.: WO2018/041697
PCT Pub. Date: Mar. 8, 2018

(65) Prior Publication Data
US 2019/0248554 A1    Aug. 15, 2019

(30) Foreign Application Priority Data
Aug. 31, 2016 (EP) ..................... 16186544

(51) Int. Cl.
*A24F 23/00* (2006.01)
*B65D 51/24* (2006.01)
(Continued)

(52) U.S. Cl.
CPC ............ *B65D 51/245* (2013.01); *A24F 23/00* (2013.01); *B29B 7/88* (2013.01); *B29C 45/0001* (2013.01);
(Continued)

(58) Field of Classification Search
CPC .. B65D 51/245; B65D 79/02; B65D 85/1081; B29B 7/88; A24F 23/00; A24F 15/18
See application file for complete search history.

(56) References Cited

U.S. PATENT DOCUMENTS

| | | | |
|---|---|---|---|
| 5,431,697 A | 7/1995 | Kamata et al. | |
| 7,798,319 B1* | 9/2010 | Bried ..................... | B65D 51/16 206/242 |

(Continued)

FOREIGN PATENT DOCUMENTS

| | | |
|---|---|---|
| EP | 2904914 A1 | 8/2015 |
| GB | 2478573 A | 9/2011 |
| WO | 2007/021294 A1 | 2/2007 |

OTHER PUBLICATIONS

Office Action in the Corresponding Russian Application 2019103956 dated May 23, 2019, 6 pages.

(Continued)

*Primary Examiner* — King M Chu
(74) *Attorney, Agent, or Firm* — Workman Nydegger

(57) ABSTRACT

The present invention relates to a container for a tobacco related product, comprising at least a base portion and a top portion defining at least one closable compartment for storing the tobacco related product. At least one wall portion of the container comprises a thermochromic material as an integral part, wherein the thermochromic material is configured for undergoing a visible color change in a temperature range between 0° C. and 0° C. Thus, information on a preferred consumption condition of the tobacco related product can be provided to a user. The invention further relates to methods for manufacturing such container and further relates to the use of a thermochromic material in a container for a tobacco related product.

13 Claims, 3 Drawing Sheets

(51) Int. Cl.
  *B65D 79/02*   (2006.01)
  *B29B 7/88*   (2006.01)
  *B29C 45/00*   (2006.01)
  *B29C 45/14*   (2006.01)
  *B29K 105/00*   (2006.01)
  *B29L 31/00*   (2006.01)

(52) U.S. Cl.
  CPC ........ *B29C 45/14467* (2013.01); *B65D 79/02* (2013.01); *B29K 2105/0032* (2013.01); *B29L 2031/717* (2013.01); *B65D 2203/12* (2013.01); *B65D 2209/00* (2013.01)

(56) References Cited

U.S. PATENT DOCUMENTS

2013/0292279 A1* 11/2013 Bengtsson ............. D21H 17/68
                                                            206/245
2016/0194132 A1   7/2016 Davidson et al.

OTHER PUBLICATIONS

European Search Report for Corresponding EP Application 16186544.9 dated Mar. 13, 2017, 7 pages.
International Search Report and Written Opinion of PCT/EP2017/071274 dated Oct. 27, 2017, 15 pages.
"Thermochromic Pigments, Dyes & Liquid Crystal Ink," available at URL:http://www.thermographics.com/Portals/0/Documents/SpecialtyInk/Thermochromic/SM306 RevOO Thermochromics for Thermagraphics.pdf?ver=2016-04-27-101007-440 available at least as early as Mar. 1, 2017, 1 page.

* cited by examiner

CONTAINER FOR A TOBACCO RELATED PRODUCT

FIELD OF THE INVENTION

The present invention relates to a container for a tobacco related product, a method of manufacturing a container for a tobacco related product and the use of a thermochromic material in a container for a tobacco related product.

BACKGROUND

A variety of different tobacco related products is offered on the market, wherein some of these products do not require combustion but are intended for either oral or nasal administration. Examples of such products comprise chewing tobacco, smokeless snuff and so called "snus". Snus is a smokeless tobacco product which is provided in loose form or in individually wrapped pouches. As most moist tobacco products, snus is particularly sensitive to environmental impacts such as changes in temperature or humidity. In order to ensure freshness of such products they are usually delivered in substantially air tight packages. A typical package, for example for snus, is a substantially cylindrical can or container which is made from metal or a resilient plastic material.

In order to prolong the durability of snus, it is usually stored and offered in fridges that are set up particularly for snus products. Next to improved freshness, the cooling shall further enhance the user experience as snus is believed to unfold its full flavor in a cooled condition. There are no snus containers known from the prior art that allow a user to distinguish between cooled and uncooled products. It is thus an aspect of the present invention to provide a container for a tobacco related product, particularly snus, that allows a user to recognize the cooling condition of the container and its content.

SUMMARY OF INVENTION

According to an aspect of the present invention, a container for a tobacco related product, particularly snus, is provided. The container comprises at least a base portion and a top portion, wherein the base portion and the top portion define at least a first closable compartment for storing the tobacco related product, particularly between the base portion and the top portion. At least one wall portion of the container comprises a thermochromic material as an integral part. In other words, the thermochromic material constitutes at least a part of the wall portion itself. The thermochromic material is configured for undergoing a visible color change in a temperature range between 0° C. and 10° C. In other words, the color of the wall portion changes if its temperature comes across a temperature between 0° C. and 10° C. Thus, the container according to the present invention is configured for providing information on an actual cooling status of the container.

As the thermal weight of a typical snus container is rather small, temperature equilibrium is quickly achieved between the container and the tobacco related product stored inside. As the thermochromic material is an integral part of the wall portion, the influence of heat transfer is minimized. The container of the invention thus allows for indicating a preferred consumption condition of the tobacco related product inside the container, i.e. whether the tobacco related product itself is in a cooled condition that is suitable for consumption. In a preferred embodiment the color of the wall portion is identical to the color of a surrounding of the wall portion at any temperature above the predetermined temperature. Thus, the wall portion might not be distinguished from the background, i.e. the remaining wall portions of the container, at any temperature above the predetermined temperature and might be distinguished once the color change has occurred. Further, the at least one wall portion might have the shape of at least one letter or pictogram in order to provide an indication message for a user that the tobacco related product is in good condition to be consumed.

In a preferred embodiment, the thermochromic material is a reversible thermochromic material configured for undergoing a reversible color change. Thus, a first color change of the wall portion occurs if the temperature rises above the predetermined temperature and a second color change occurs if the temperature again falls below the predetermined temperature, whereby the second color change reverses the first color change. In this embodiment, the thermal history of the container has no impact on the color of the wall portion. Thus, the container can be stored in any condition, i.e. at any temperature, before it is filled with the tobacco related product that may require cooling. Further, such container may be reused multiple times. Snus is in the best condition for consumption, when it is cooled to a temperature between 0° C. and 10° C., preferably to a temperature between 2° C. and 8° C. Thus, the predetermined temperature is preferably a temperature between 2° C. and 8° C. to indicate that the tobacco related product is in an optimal condition for consumption.

In a further preferred embodiment of the present invention, the thermochromic material is configured for undergoing a first visible color change at a first temperature in a first temperature range between 5° C. and 10° C. and for undergoing a second visible color change at a second temperature in a second temperature range between 0° C. and 5° C. Thus, the color of the wall portion of a container according to this embodiment indicates whether the container comprises a temperature between the first and the second temperature. Thus, it is possible to indicate whether the container and thus its content are in a preferred temperature range. According to another preferred embodiment, the second visible color change reverses the first visible color change. Further preferred, the color of the wall portion at temperatures above the first temperature and below the second temperature is identical to the color of a surrounding of the wall portion. Thus, the wall portion might not be distinguished at any temperature outside the predetermined temperature range and might be distinguished within that range. Also preferred, the first temperature is 8° C. and the second temperature is 2° C.

According to a preferred embodiment, the at least one wall portion of the container is part of at least one of the base portion and the top portion. In other words, a section of either the base portion or the top portion might comprise the thermochromic material. In a preferred embodiment, multiple wall portions may be formed as pictograms, e.g. as snow crystals, on the base portion and/or the top portions. Alternatively, the wall portion may constitute the base portion and/or the top portion. In other words, the whole base portion and/or the whole top portion may be integrally formed from the thermochromic material. In this embodiment, the color of the whole base portion and/or the whole top portion may change at the predetermined temperature(s) and thus, the color change may be clearly visible.

According to another embodiment, the container may further comprise a cover element that is configured to be attached to or that is attached to either the base portion or to the top portion. The cover element may have an only aesthetical function or may function to enclose an additional compartment of the container. The cover element may be attached to the top portion or base portion by a hinge element that may be formed integrally with the top portion or base portion. The cover element may be attachable to the top portion or the base portion as a plug cap or may be attached swiveable or rotatable to the top portion or base portion. According to this embodiment, the at least one wall portion may be part of the cover element or may constitute the cover element. Thus, this embodiment allows adding the color change function as temperature indicator by adding a cover element comprising such wall portion to a usual top portion or base portion.

In a further embodiment, the thermochromic material is a thermochromic plastic composition comprising thermochromic pigments, a combination of thermochromic pigments or a formulation comprising thermochromic pigments. In other words, the plastic itself shows a color change at the predetermined temperature(s), wherein the intensity or visibility of the color changes depends on the amount of pigments within the plastic composition. In a particularly preferred embodiment, the thermochromic plastic composition comprises from 1 to 30, preferably, from 1 to 20 and particularly preferred from 1 to 10 percent by weight of the thermochromic pigments. Snus containers are often made from a plastic material and thus this embodiment provides a simple option to form a wall portion comprising thermochromic material as an integral part of such container. Preferably, the wall portion with the thermochromic material is monolithic with the container, i.e. base portion, top portion or cover element. Thus, the sealing tightness of the container as a whole, e.g. with respect to humidity, can be increased.

Further preferred, the thermochromic pigments, combination of thermochromic pigments or formulation of thermochromic pigments may comprise microencapsulated pigments that are blended with the plastic composition. The pigment formulation may comprise liquid crystals with temperature sensitive structural changes. Such liquid crystals may be selected from the group of cholesteryl nonanoate and cyanobiphenyls. A suitable pigment formulation may be achieved by a composition of cholesteryl oleyl carbonate, cholesteryl nonanoate and cholesteryl benzoate, wherein the temperature(s) of the color change(s) can be varied by varying the mass proportions of the constituents. Alternatively, the thermochromic pigments may comprise leuco dyes, preferably microencapsulated leuco dyes. While using leuco dyes the thermochromic behavior may be achieved by using a halochromatic pigment and a suitable solvent, i.e. with temperature dependent pH value. The microcapsules may comprise a dye, a weak acid, and a dis8° Ciable salt dissolved in dodecanol. The dyes may be selected from the group comprising spirolactones, fluorans, spiropyrans and fulgides. The acids may be selected from the group comprising bisphenol A, parabens, 1,2,3-triazole derivates, and 4-hydroxycoumarin. However, other thermochromic pigments may be used. A variety of thermochromic pigments as well as protocols for acquiring such pigments with a color change at a certain temperature or in a certain temperature range are known to the skilled person.

According to a preferred embodiment, the container according to the invention comprises a first closable compartment for storing the tobacco related product prior to use by a consumer and a second closable component for storing the tobacco related product after use by a consumer. A variety of such container designs is already known and shall provide packs which allows a consumer to dispose the used smokeless tobacco without or minimum interference with fresh and unused tobacco. According to the preferred embodiment, the at least one wall portion comprising a thermochromic material as an integral part does not constitute an enclosure of the first compartment. In other words, in this embodiment the wall portion exclusively constitutes an enclosure of the second compartment. In other words the wall portion contacts the second compartment but not the first compartment. Advantageously in this embodiment, the pigments used must not necessarily be food compliant as they do not come in close contact with the unused product.

In a particularly preferred embodiment, the first closable compartment is defined between the base portion and the top portion and the second closable compartment is defined between the cover element and the top portion. In order to achieve this, the top cover may comprise a recess that may be covered by a cover element, e.g. configured as plug cover, in order to form the second compartment. In this embodiment, the at least one wall portion is part of or constitutes the cover element. Advantageously this embodiment may be realized with already existing top portions and base portions and thus constitute an option for upgrading existing containers. In similar fashion, other types of containers comprising external cover elements, preferably for covering a second compartment for used product, may be upgraded with a cover sheet comprising a wall portion with a thermochromic material as an integral part. Further preferred for all embodiments, the wall portion is part of an external surface of the container in order to ensure the visibility of the visible color change, where the visible color change refers to a change to or between colors in the visible spectra.

Further preferred, the container according to the invention also comprises an irreversible thermochromic material configured to undergo an irreversible visible color change, when exceeding a predetermined temperature. The irreversible thermochromic material may be an integral part of a wall portion of the container as described above with respect to the reversible thermochromic material. Alternatively, the irreversible thermochromic material may be attached to a container according to the invention, e.g. as an adhesive label or as an ink comprising thermochromic pigments. However, such irreversible thermochromic material is always in addition to the wall portion with reversible thermochromic material as integral part. Adding an irreversible thermochromic material allows providing an indicator whether the temperature of the container has ever exceeded a certain threshold temperature, wherein this threshold temperature might be so harmful to the quality of the product within the container that further use of the product may not be recommended. In other words, a consumer can recognize whether a cooling chain was interrupted.

Another aspect of the present invention relates to a method for manufacturing a container for a tobacco related product according to the invention as described above. The method comprises at least the steps of: providing thermochromic pigments capable of showing a visible color change in a temperature range between 0° C. and 10° C.; providing a plastic precursor mix by mixing the thermochromic pigments with a plastic precursor batch with 1 to 30 percent by weight, 1 to 20 percent by weight and particularly preferred 1 to 10 percent by weight of the thermochromic pigments in the plastic precursor mix; injection molding at least a part of at least one of a base portion, a top portion and a cover element of the container from the plastic precursor mix; and assembling the container using at least two of the base portion, the top portion and the cover element. In other words, at least one part of a container for a tobacco related product is manufactured using a plastic precursor mix comprising thermochromic pigments. This part is then assembled with other likewise produced or normally, i.e. without thermochromic pigments, produced parts to a container, e.g. by gluing, co-melting, welding, pure mechanical interaction or the like. Thus, the at least one part that is manufactured from the plastic precursor mix is solely made from material comprising thermochromic pigments. The pigments may show the color change in a temperature range between 0° C. and 10° C. even in isolated form or only when they are contained in the plastic precursor mix or the molded plastic composition.

According to an alternative embodiment of the method for manufacturing a container for a tobacco related product according to the invention as described above, the method comprises at least the steps of: providing thermochromic pigments capable of showing a visible color change in a temperature range between 0° C. and 10° C.; providing a plastic precursor mix by mixing the thermochromic pigments with a plastic precursor batch with 1 to 3a percent by weight, 1 to 2a percent by weight and particularly preferred 1 to 1 a percent by weight of the thermochromic pigments in the plastic precursor mix; providing at least one of a base portion a top portion and a cover element of the container and inserting it into a mold; insert molding a wall portion on at least one of the base portion, the top portion and the cover element of the container from the plastic precursor mix; and assembling the container using at least two of the base portion, the top portion and the cover element. Insert molding differs from injection molding in that an insert is present in the mold before injecting the plastic precursor or molten thermoplastic. Thus, the insert and the injected plastic are fused to a single component in a monolithic fashion. For example, a wall portion can insert molded onto a wall of a container portion, e.g. a top portion or a base portion. Thus, according to this embodiment, none of the components to be assembled to the container must be solely made of a material comprising thermochromic pigments. This embodiment also provides a method for upgrading already existing base portions by reusing existing mold tools with minor amendments. The pigments may show the color change in a temperature range between 0° C. and 10° C. even in isolated form or only when they are contained in the plastic precursor mix or the molded plastic composition.

Another aspect of the present invention relates to the use of a thermochromic material configured for undergoing a visible color change in a temperature range between 0° C. and 10° C. in a container of a tobacco related product for providing information on a preferred consumption condition of the tobacco related product. The container and the thermochromic material may be designed as described above.

According to a first example a container for a tobacco related product is provided, comprising at least a base portion and a top portion defining at least a first closable compartment for storing the tobacco related product, wherein at least one wall portion of the container comprises a thermochromic material as an integral part, and wherein the thermochromic material is configured for undergoing a visible color change in a temperature range between 0° C. and 10° C. for providing information on a preferred consumption condition of the tobacco related product.

According to a second example a container for a tobacco related product is provided, wherein the thermochromic material is configured for undergoing a first visible color change in a first temperature range between 5° C. and 10° C. and a second visible color change in a second temperature range between 0° C. and 5° C.

According to a third example a container for a tobacco related product is provided, wherein the second visible color change reverses the first visible color change.

According to a fourth example a container for a tobacco related product is provided, wherein the at least one wall portion is part of or constitutes at least one of the base portion and the top portion.

According to a fifth example a container for a tobacco related product is provided, further comprising a cover element configured to be attached to or being attached to the base portion or to the top portion, wherein the at least one wall portion is part of or constitutes at least one of the base portion, the top portion and the cover element.

According to a sixth example a container for a tobacco related product is provided, wherein the thermochromic material is a thermochromic plastic composition comprising one kind of, a combination of or a formulation of thermochromic pigments.

According to a seventh example a container for a tobacco related product is provided, wherein the thermochromic plastic composition comprises from 1 to 1 a percent by weight of the thermochromic pigments.

According to an eighth example a container for a tobacco related product is provided, comprising the first closable compartment for storing the tobacco related product prior to use by a consumer and a second closable component for storing the tobacco related product after use by a consumer, wherein the at least one wall portion does not constitute an enclosure of the first compartment.

According to a ninth example a container for a tobacco related product is provided, wherein the first closable compartment is defined between the base portion and the top portion, wherein the second closable compartment is defined between the cover element and the top portion and wherein the at least one wall portion is part of or constitutes the cover element.

According to a tenth example a container for a tobacco related product is provided, wherein the wall portion is part of an external surface of the container.

According to a eleventh example a container for a tobacco related product is provided, wherein the thermochromic material is a reversible thermochromic material configured for undergoing a reversible color change.

According to a twelfth example a container for a tobacco related product is provided, further comprising an irreversible thermochromic material configured to undergo an irreversible visible color change, when exceeding a predetermined threshold temperature.

According to a thirteenth example a method for manufacturing a container for a tobacco related product is provided, comprising the steps of providing thermochromic pigments capable of showing a visible color change in a temperature range between 0° C. and 10° C., providing a plastic precursor mix by mixing the thermochromic pigments with a plastic precursor batch with 1 to 1 a percent by weight of the thermochromic pigments in the plastic precursor mix, injection molding at least a part of at least one of a base portion, a top portion and a cover element of the container from the plastic precursor mix, and assembling the container using at least two of the base portion, the top portion and the cover element.

According to a fourteenth example a method for manufacturing a container for a tobacco related product, comprising the steps of providing thermochromic pigments capable of showing a visible color change in a temperature range between 0° C. and 10° C., providing a plastic precursor mix by mixing the thermochromic pigments with a plastic precursor batch with 1 to 1 a percent by weight of the thermochromic pigments in the plastic precursor mix, and providing at least one of a base portion, a top portion and a cover element of the container and inserting it into a mold, insert molding a wall portion on at least one of the base portion, the top portion and the cover element inserted into the mold from the plastic precursor mix, and assembling the container using at least two of the base portion, the top portion and the cover element.

According to a fifteenth example, a use of a thermochromic material is provided wherein the thermochromic material is configured for undergoing a visible color change in a temperature range between 0° C. and 10° C. in a container of a tobacco related product for providing information on a preferred consumption condition of the tobacco related product

BRIEF DESCRIPTION OF DRAWINGS

Further features of the invention will become apparent to those of ordinary skill in the art by describing in detail exemplary embodiments with reference to the attached drawings in which.

DETAILED DESCRIPTION OF EXAMPLE EMBODIMENTS

Figure 1:
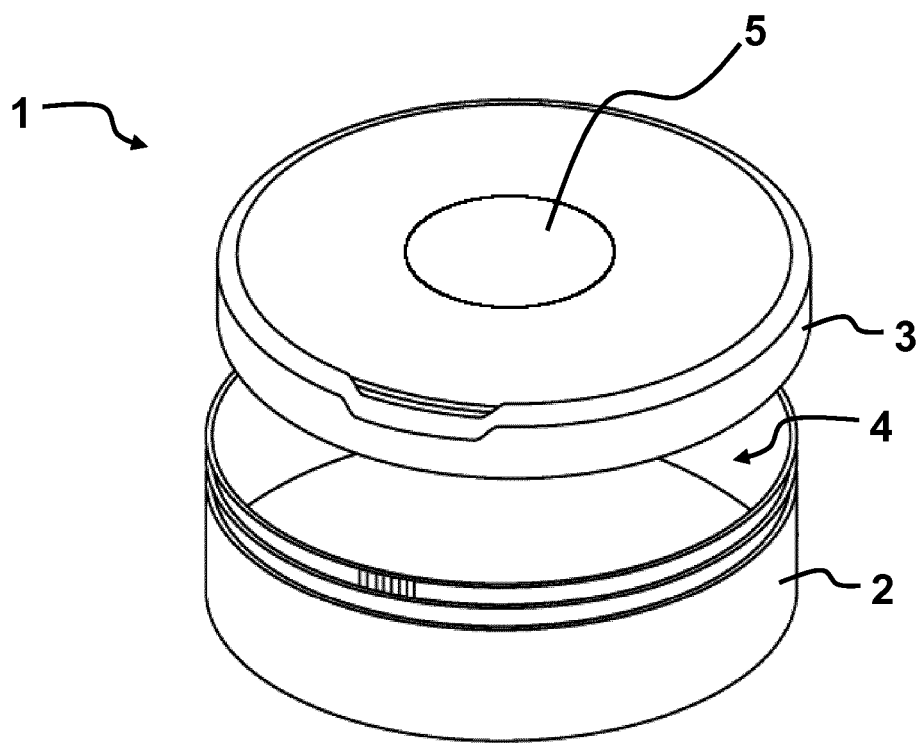
FIG. 1 illustrates a perspective view of a container according to a first embodiment.

FIG. 1 is a perspective view on an opened container 1 according to a first embodiment. The container 1 has a base portion 2 and a top portion (or lid) 3. A first compartment 4 for unused tobacco product is located between the top portion 3 and the base portion 2. On an upper surface of the top cover 3 a wall portion 5 is provided that comprises thermochromic material as an integral part. The wall portion 5 may be even with or may protrude from the upper surface of the top portion 3. The wall portion 5 is configured to undergo a visible color change at a temperature of 8° C. The color of the wall portion 5 is identical to the color of the remaining top portion 3 at any temperature above 8° C. and is distinguished from the remaining top portion 3 at any temperature below 8° C. The central position of the wall portion 5 on the upper surface of top portion 3 allows for an easy recognition of its color change.

Figure 2:
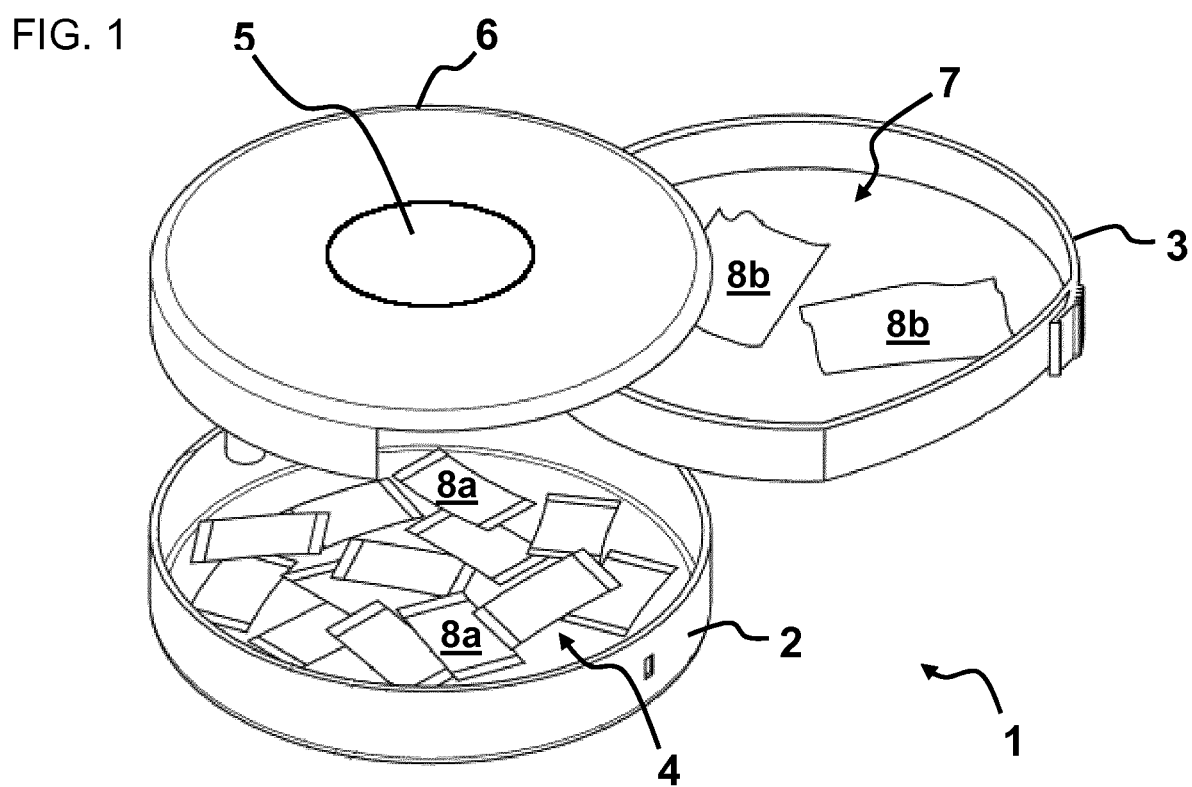
FIG. 2 illustrates a perspective view of a container according to a second embodiment.

FIG. 2 is a perspective view on an opened container 1 according to a second embodiment. Features that are similarly or identically to the container 1 shown in FIG. 1 are assigned with identical reference signs. The container 1 according to FIG. 2 comprises a base portion 2 and a top portion 3 defining a first compartment 4 for unused tobacco related Sa product between the base portion 2 and the top portion 3. The container 1 further comprises a cover element 6 configured to be attached to the top portion 3 and the base portion 2 and defining a second compartment 7 for used tobacco related product Sb between the top portion 3 and the cover element 6. The cover element 6 is coupled to the top portion 3 via a first hinged connection such that the cover element 6 is swivelable about a first swiveling axis for opening and closing a second access opening to the second compartment 7. The base portion 2 is coupled to the cover element 6 via a second hinged connection in that the base portion 2 is swivelable about a second swiveling axis for opening and closing a first access opening to the first compartment 4. The first and the second swiveling axis project substantially perpendicularly to the access openings to the first and second compartments 4, 7. A detailed description of the swiveling mechanism of the container of FIG. 2 can be found in W0201419S935A 1, the content of which is fully incorporated herein by reference.

The cover element 6 of the container 1 illustrated in FIG. 2 comprises a wall portion 5 that is configured to undergo a first visible color change at a temperature of 8° C. and to undergo a second visible color change at a temperature of 2° C. The second visible color change reverses the first visible color change and the color of the wall portion 5 is identical to the color of the remaining cover element 6 at any temperature above 8° C. and below 2° C. and differs from the remaining cover element 6 at any temperature between 8° C. and 2° C. Advantageously the upper surface of the cover element 6 does not constitute an enclosure of the first compartment 4 and thus the thermochromic pigments must not be food compliant as the unused tobacco related product Sa cannot come into contact with the cover element 6.

Figure 3:
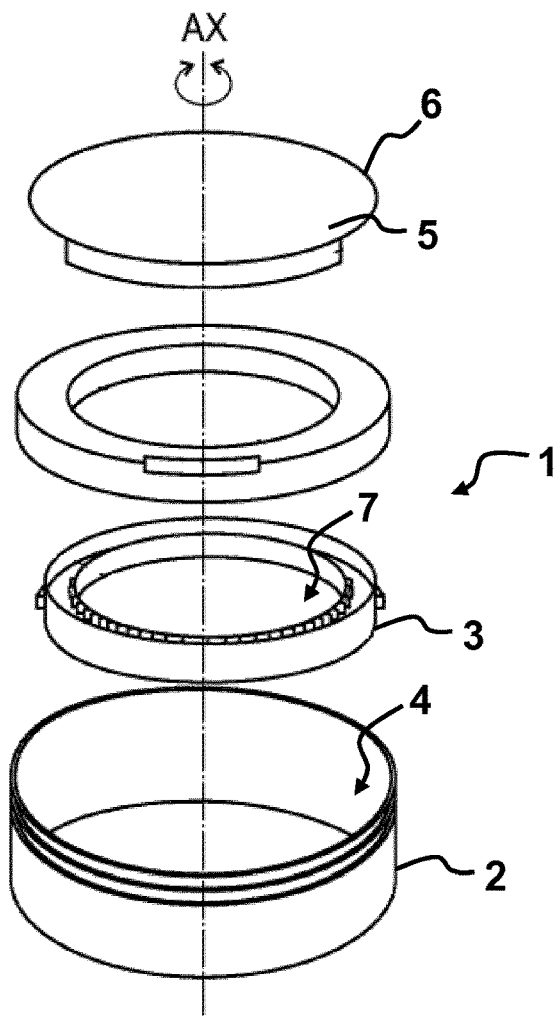
FIG. 3 illustrates a perspective view of a container according to a third embodiment.

FIG. 3 is a perspective view on an opened container 1 according to a third embodiment. Features that are similarly or identically to the container 1 shown in FIG. 1 are assigned with identical reference signs. The container 1 according to FIG. 3 comprises a base portion 2 and a top portion 3 defining a first compartment 4 between the base portion 2 and the top portion 3. The container 1 further comprises a cover element 6 for defining a second compartment 7 between the top portion 3 and the cover element 6. The top portion 3 is configured as a displaceable wall that is coupled to the cover element 6 by a screw thread for displacing the top portion 3 by rotating the cover element 6. A detailed description of the mechanism of the displaceable wall mechanism of the container of FIG. 3 can be found in US2015/0216230 A1, the content of which is fully incorporated herein by reference.

The cover element 6 of the container 1 illustrated in FIG. 3 comprises a wall portion 5 that constitutes the cover element 6, i.e. the wall portion 5 extends over the whole external surface of the cover element 6. The wall portion is configured to undergo a first visible color change at a temperature of 8° C. and to undergo a second visible color change at a temperature of 2° C. The second visible color change reverses the first visible color change and the color of the wall portion 5 is identical to the color of the remaining cover element 6 at any temperature above 8° C. and below 2° C. and differs from the remaining cover element 6 at any temperature between 8° C. and 2° C. Advantageously the cover element 6 does not constitute an enclosure of the first compartment 4 at all and thus the thermochromic pigments must not be food compliant as unused tobacco related product will not come into contact with cover element 6.

Figure 4:
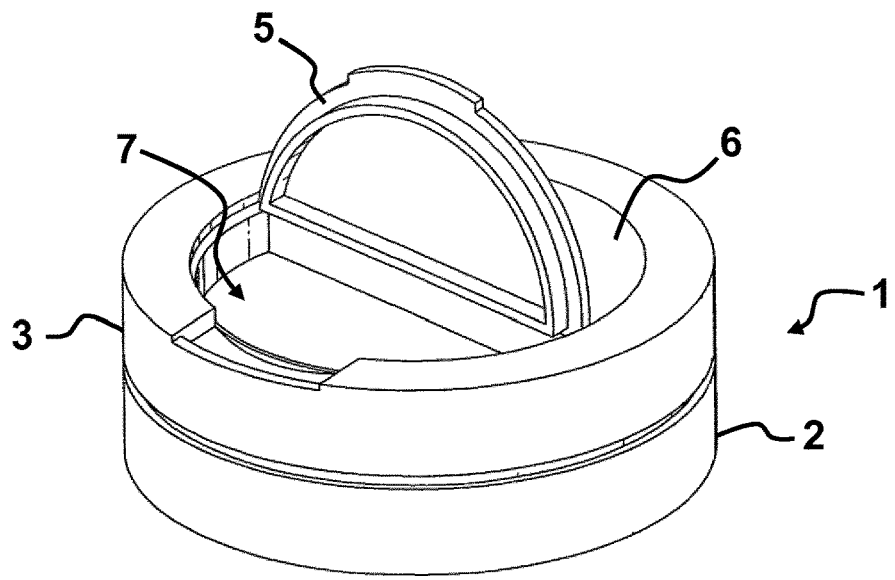
FIG. 4 illustrates a perspective view of a container according to a fourth embodiment.

FIG. 4 is a perspective view on an opened container 1 according to a fourth embodiment. Features that are similarly or identically to the container 1 shown in FIG. 1 are assigned with identical reference signs. The container 1 has a base portion 2 and a top portion (or lid) 3. A first compartment (not shown) for unused tobacco product is located between the top portion 3 and the base portion 2. The top portion 3 comprises a central recess that forms a second compartment 7. A cover element 6 is configured as a plug cover for the recess in the top portion 3 and comprises a swivelable part connected to the remaining cover element 6 via a hinge connection. The second compartment 7 is accessible by swiveling the swivelable part around the hinge connection. At least the swivelable part of the cover element 6 comprises a wall portion 5 with thermochromic material as an integral part. The wall portion 5 is configured to undergo a visible color change at a temperature of 8° C. and has a color that is identical to the color of the remaining top portion 3 at any temperature above 8° C. Advantageously the wall portion 5 does not constitute an enclosure of the first compartment 4 and thus the thermochromic pigments must not be food compliant.

Figure 5:
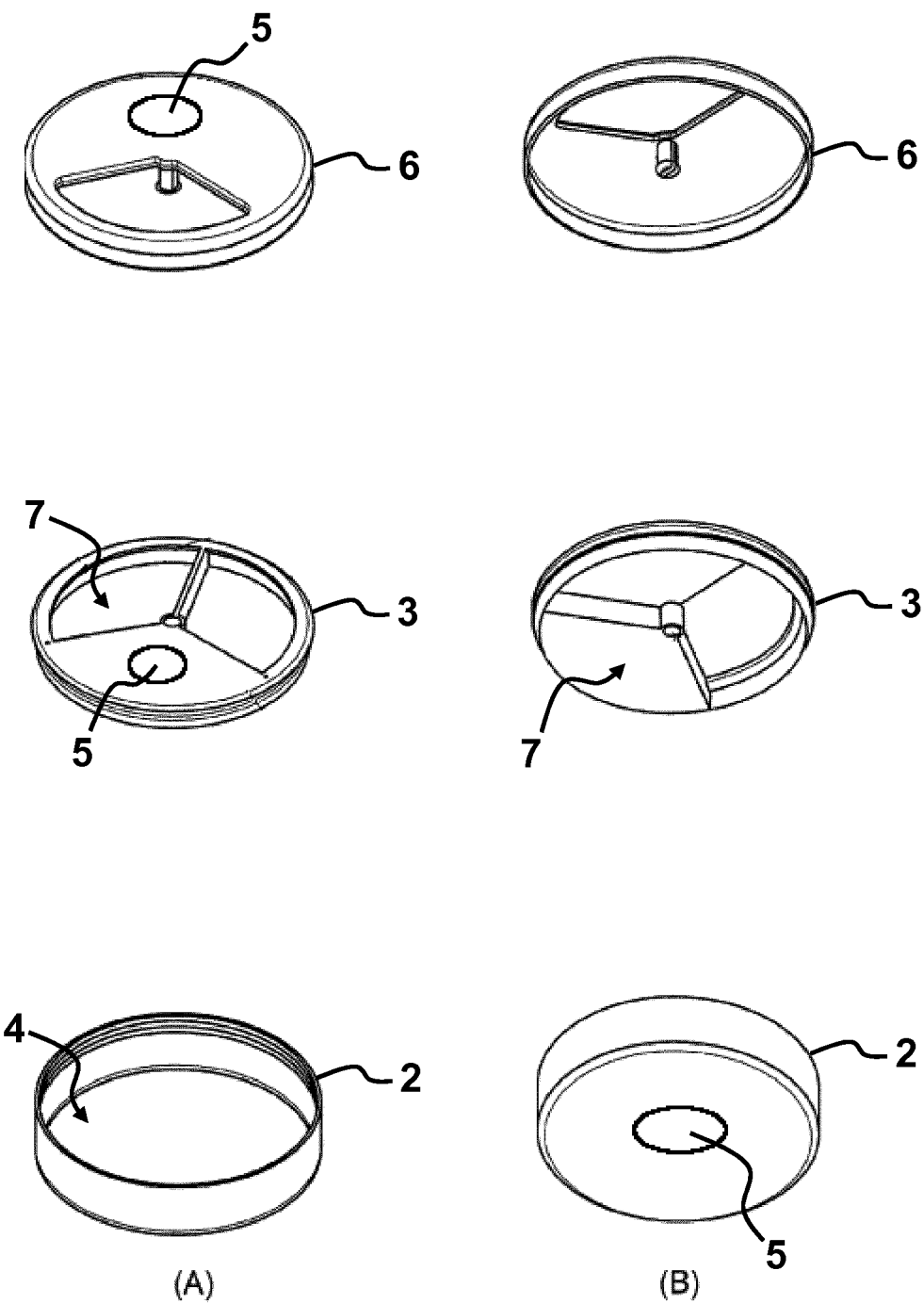
FIG. 5A illustrates a top perspective view of a container according to a fifth embodiment.
FIG. 5B illustrates a bottom perspective view of a container according to the fifth embodiment.

FIG. 5 is a perspective view on an opened container 1 according to a fifth embodiment. Features that are similarly or identically to the container 1 shown in FIG. 1 are assigned with identical reference signs. The container 1 has a base portion 2 and a top portion (or lid) 3. A first compartment 4 for unused tobacco product is located between the top portion 3 and the base portion 2. The top portion 3 further comprises at least one access opening to the first compartment 4, wherein the cover element 6 is configured to close the at least one access opening, when it is rotated into a certain position. Therefore it is swivelable about a central axis of rotation, which projects substantially perpendicularly to a plane of the access opening. The top portion 3 further comprises a recess that forms a second compartment 7 and that can be accessed via an opening in the cover element 6 and by rotating the cover element 6 into a certain position.

The base portion 2, the top portion 3 and/or the cover element 6 of the container 1 illustrated in FIG. 5 comprises a wall portion 5 that is configured to undergo a first visible color change at a temperature of 8° C. and to undergo a second visible color change at a temperature of 2° C. Advantageously the wall portions 5 on the top portion 3 and the cover element 6 do not constitute an enclosure of the first compartment 4, i.e. they are not in direct contact to the first compartment 4 and thus the thermochromic pigments must not be food compliant. Preferably, a wall portion 5 on the base portion 2 is insert molded onto a lower surface of the base portion 2 and thus does also not constitute an enclosure of the first compartment 4.

The invention claimed is:

1. A container for a tobacco related product, comprising at least a base portion and a top portion defining at least a first closable compartment for storing the tobacco related product prior to use by a consumer and a second closable component for storing the tobacco related product after use by a consumer, wherein at least one wall portion (5) of the container comprises a thermochromic material as an integral part, and wherein the thermochromic material is configured for undergoing a visible color change in a temperature range between 0° C. and 10° C. for providing information on a preferred consumption condition of the tobacco related product, and wherein the at least one wall portion does not constitute an enclosure of the first compartment.

2. The container according to claim 1, wherein the thermochromic material is configured for undergoing a first visible color change in a first temperature range between 5° C. and 10° C. and a second visible color change in a second temperature range between 0° C. and 5° C.

3. The container according to claim 2, wherein the second visible color change reverses the first visible color change.

4. The container according to claim 1, wherein the at least one wall portion is part of or constitutes at least one of the base portion and the top portion.

5. The container according to claim 1, further comprising a cover element configured to be attached to or being attached to the base portion or to the top portion, wherein the at least one wall portion is part of or constitutes at least one of the base portion, the top portion and the cover element.

6. The container according to claim 1, wherein the thermochromic material is a thermochromic plastic composition comprising one kind of, a combination of or a formulation of thermochromic pigments.

7. The container according to claim 6, wherein the thermochromic plastic composition comprises from 1 to 10 percent by weight of the thermochromic pigments.

8. The container according to claim 5, wherein the first closable compartment is defined between the base portion and the top portion, wherein the second closable compartment is defined between the cover element and the top portion and wherein the at least one wall portion is part of or constitutes the cover element.

9. The container according to claim 1, wherein the wall portion is part of an external surface of the container.

10. The container according to claim 1, wherein the thermochromic material is a reversible thermochromic material configured for undergoing a reversible color change.

11. The container according to claim 1, further comprising an irreversible thermochromic material configured to undergo an irreversible visible color change, when exceeding a predetermined threshold temperature.

12. A method for manufacturing a container for a tobacco related product according to claim 1, comprising the steps:
providing thermochromic pigments capable of showing a visible color change in a temperature range between 0° C. and 10° C.;
providing a plastic precursor mix by mixing the thermochromic pigments with a plastic precursor batch with 1 to 10 percent by weight of the thermochromic pigments in the plastic precursor mix;
injection molding at least a part of at least one of a base portion, a top portion and a cover element of the container from the plastic precursor mix; and
assembling the container using at least two of the base portion, the top portion and the cover element.

13. The method for manufacturing a container for a tobacco related product according to claim 1, comprising the steps:
providing thermochromic pigments capable of showing a visible color change in a temperature range between 0° C. and 10° C.;
providing a plastic precursor mix by mixing the thermochromic pigments with a plastic precursor batch with 1 to 1 a percent by weight of the thermochromic pigments in the plastic precursor mix;
providing at least one of a base portion, a top portion and a cover element of the container (1) and inserting it into a mold;
insert molding a wall portion on at least one of the base portion, the top portion and the cover element inserted into the mold from the plastic precursor mix; and
assembling the container using at least two of the base portion, the top portion and the cover element.

* * * * *